(12) United States Patent
Weiss et al.

(10) Patent No.: US 7,676,419 B2
(45) Date of Patent: Mar. 9, 2010

(54) CACHING MECHANISM TO OPTIMIZE A BIDDING PROCESS USED TO SELECT RESOURCES AND SERVICES

(75) Inventors: Michael Weiss, Ottawa (CA); Babak Esfandiari, Ottawa (CA)

(73) Assignee: Mitel Networks Corportion, Ottawa, Ontario (CA)

( * ) Notice: Subject to any disclaimer, the term of this patent is extended or adjusted under 35 U.S.C. 154(b) by 2863 days.

(21) Appl. No.: 09/768,129

(22) Filed: Jan. 23, 2001

(65) Prior Publication Data

US 2001/0018678 A1 Aug. 30, 2001

(30) Foreign Application Priority Data

Jan. 25, 2000 (GB) .................................. 0001695.6

(51) Int. Cl.
*G06Q 40/00* (2006.01)

(52) U.S. Cl. ............................... 705/37; 705/35; 705/39
(58) Field of Classification Search .................. 705/37, 705/35, 39
See application file for complete search history.

(56) References Cited

U.S. PATENT DOCUMENTS

| 5,675,636 | A | | 10/1997 | Gray | |
|---|---|---|---|---|---|
| 6,005,925 | A | * | 12/1999 | Johnson et al. | 379/115.02 |
| 6,073,176 | A | * | 6/2000 | Baindur et al. | 709/227 |
| 6,363,365 | B1 | * | 3/2002 | Kou | 705/64 |
| 6,415,270 | B1 | * | 7/2002 | Rackson et al. | 705/36 R |
| 6,738,975 | B1 | * | 5/2004 | Yee et al. | 719/310 |

* cited by examiner

*Primary Examiner*—James P Trammell
*Assistant Examiner*—Elda Milef

(57) ABSTRACT

A caching mechanism is provided for use by a Bid Manager in a multi-agent resource allocation bidding system. The caching mechanism stores the most recent bids issued by one or more Bidders for a given bidding context. The cache is updated using a notification mechanism.

17 Claims, 8 Drawing Sheets

CACHING MECHANISM TO OPTIMIZE A BIDDING PROCESS USED TO SELECT RESOURCES AND SERVICES

FIELD OF THE INVENTION

The present invention relates in general to multi-agent resource allocation bidding systems and more particularly to a caching mechanism for storing most recent bids by bidders for a given bidding context in order to optimize the bidding process.

BACKGROUND OF THE INVENTION

Telecommunication systems have recently been designed for providing a variety of real-time services and features in an open distributed environment through the collaboration of a set of software components called agents. Such multi-agent systems are designed in such a way that they may adapt and evolve in the face of changing environments. One such multi-agent system is known as MANA (Multi-Agent Architecture for Networking Applications) developed by Mitel Corporation. Through the use of a distributed agent architecture, the system meets high reliability levels and adapts to accommodate technological or service evolution. To achieve these goals, intelligence or learning mechanisms are provided to update service information derived from the operation of the agents. This information is used to redefine the agents and to reallocate resources for correcting failures and to meet the requirements of a defined service more precisely.

An application or service in a multi-agent system is mapped as a series of calls amongst agents to perform the service. Each agent specifies its type, quantity and quality of service (QoS) in order to provide for an overall application. Since multi-agent systems are implemented in an open environment, no agent has prior knowledge of any other agent. The only knowledge that an agent possesses is its requirements and capabilities to provide a specific type of service. Thus, an agent may be required to find other agents to fulfill certain of its service requirements. A calling agent (referred to herein as a Bid Manager) sends out a call for bids for services to a plurality of called agents (referred to herein as Bidders), each of whom may be capable of providing the necessary resources for the Bid Manager to complete its task. The Bid Manager receives and evaluates the bids from the various Bidders and selects the agent which has the best chance of success in performing the requested service. This is referred to herein as selecting the "lowest bid".

One example of a classic bidding mechanism of the foregoing type is disclosed in commonly owned U.S. Pat. No. 5,675,636 entitled Adaptive Method of Allocating Calls. According to this system, a RouterAgent sends a call for bids to a plurality of Carrier Agents in order to determine the cost to complete a call by each of the Carrier Agents. The system then selects the cheapest bid. In the embodiment disclosed in U.S. Pat. No. 5,675,636 all of the Bidders are running in the same PBX as the BidManager. However, in the case of a distributed telecommunications system, some of the bidding Carrier Agents may be running on one or more remote PBX's that are linked with the local PBX through a leased line. In such a system it is important to optimize the bidding process to avoid having to request bids from each Bidder each time a service is requested. Requesting bids can be time-costly and therefore inapplicable in real-time applications such as Advanced Automatic Route Selection (AARS) as set forth in U.S. Pat. No. 5,675,636, especially if the system is a distributed one.

SUMMARY OF THE INVENTION

According to the present invention, a caching mechanism is provided for storing the latest bids by one or more Bidders for a given bidding context. The cache is updated using a notification mechanism. The cache can also be consulted by the Bid Manager for some Bidders past the bidding deadline so that the Bid Manager does not lose a potentially good bid.

BRIEF DESCRIPTION OF THE DRAWINGS

An embodiment of the invention is described herein below with reference to the accompanying drawings, in which.

DETAILED DESCRIPTION OF THE PREFERRED EMBODIMENT

The Figures and description herein of a preferred embodiment of the invention follow the ODP (Open Distributed Processing) principle of viewpoints (ITU-T Recommendations X901 to X905|ISO/IEC 10746), and use UML (Unified Modeling Language—http://www.rational.com/uml) object-oriented methodology notations.

Figure 1:
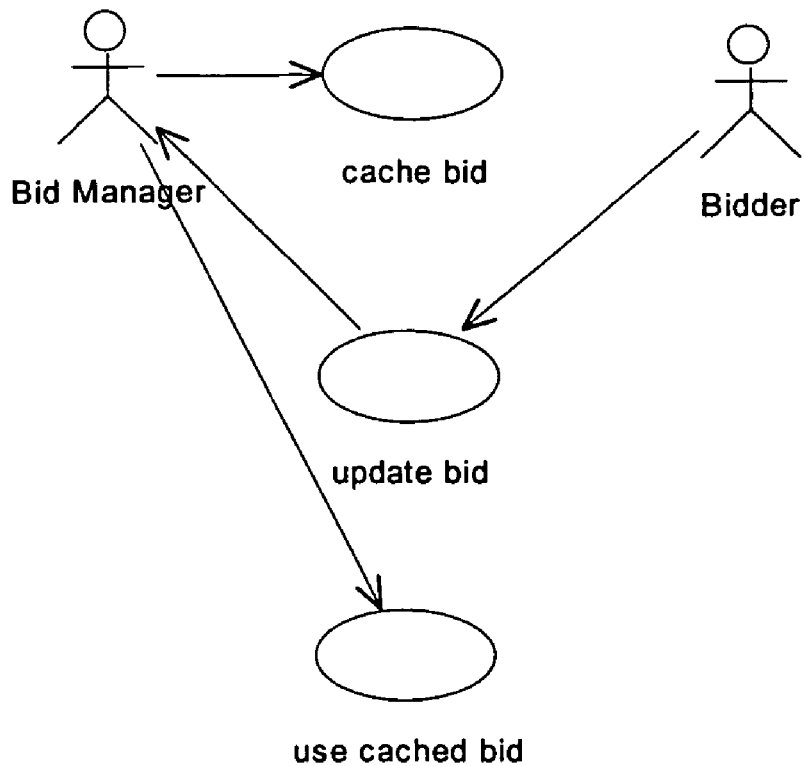
FIG. 1 is a use case diagram showing use of the system by various external actors.

Turning to FIG. 1, which represents an enterprise viewpoint of the system, a plurality of Actors and Use Cases are shown. Before describing the Actors and Use Cases in the enterprise viewpoint, it will be helpful to define the meaning of certain terms used in this disclosure, as follows:

Glossary

The "context" of a bid is the set of values that the Bidders need to know in order to calculate their bids accordingly. For example, in the AARS application of this invention, the context can consist of: destination, time of day, day of week, type of call (voice/data), call forecast (to help calculate volume discounts). The values of these parameters are preferably discrete in order to limit the number of entries in the cache. Accordingly, the 'discretization' of some values may be required to be performed, either manually or according to well-known machine learning algorithms. For example, a continuum can be broken into a finite set of contiguous intervals of equal length. Thus, a variable of range [0 . . . 3] becomes a discrete variable with the following elements: '[0 . . . 1]', '[1 . . . 2]', '[2 . . . 3]'. A value such as 1.45 would be then rounded and assimilated as the element '[1 . . . 2]'.

A "bidding policy" defines the manner in which a Bidder calculates a bid given the context of the bid. A bidding policy can be represented in several ways. It can be as simple as a table containing all possible bid values, or it can be more complex, using a set of rules, or a spreadsheet. An example of a rule in the AARS context can be: "if time of day=$\mu$M then divide current bid value by 2". For the purpose of this disclosure, no assumptions are made regarding the way bidding policies are represented in the Bidders.

Actors

The Bid Manager: The Bid Manager is a software agent that calls for bids and selects the best bid from a plurality of Bidders. An example of a Bid Manager in U.S. Pat. No. 5,675,636 is the assessment agent.

The Bidder: The Bidder is a software agent that, upon receipt of a call for bids, sends a bid for a given service that it would provide if it is selected. An example of a Bidder in U.S. Pat. No. 5,675,636 is the costing agent.

Use Cases

Cache bid: This use case starts when the Bid Manager receives a bid from a Bidder. The Bid Manager stores the information for a particular context of the call for bid, for later use.

Use cached bid: This use case starts when the Bid Manager wants to make a call for bids. If the context of that call is identical to one that has occurred previously, the Bid Manager will consult the cached information for the Bidders that have been contacted in the previous call instead of using the bidding protocol.

Update bid: This use case starts when a change occurs in a given Bidder's bidding policy. If the Bid Manager has subscribed to changes, the Bidder sends an update notification. The subscription to changes can be stored in a subscription list or table by the Bidder whenever it receives a call for bid. Each subscription corresponds to one context. When there is a change in the bidding policy, the Bidder calculates the new bid values for each of the subscribed contexts, and sends the new values to the Bid Manager. This can be a long process if the subscription list becomes too long. Accordingly, there are two solutions to solving this problem. In the first solution, the Bid Manager only subscribes for (and therefore only caches) the most used contexts in a subscription list (e.g. the first "n" entries), and unsubscribes to the others. For the others, the Bid Manager calls for bids. Another solution requires that the Bidder simply clears the subscription list and starts all over again with an empty list. This solution may also be used if the impact of the bid policy change is significant (e.g. if more than a certain percentage of the most used entries have been changed), wherein it would be inefficient to update all entries.

Figure 2:
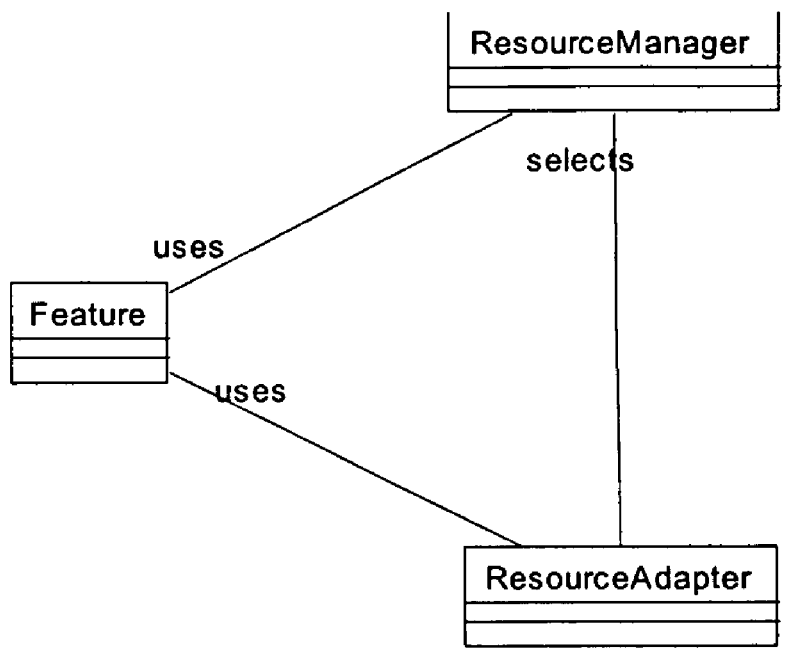
FIG. 2 is a class diagram showing the internal representation of an agent in terms of a Feature which uses a ResourceManager and a ResourceAdapter selected by the ResourceManager.

Turning to FIG. 2, a class diagram is provided comprising a general representation of the information viewpoint of the system, with emphasis on the resource management and selection aspects.

The class diagram includes a class for ResourceManager, ResourceAdapter and Feature, as follows:

Classes

The Feature class represents a portion of the logic of an agent. It uses the ResourceManager to select ResourceAdapters to trigger actions on its environment.

The ResourceManager class manages a set of ResourceAdapters, and is responsible for selecting them.

The ResourceAdapter is a class that provides a uniform interface to access APIs of resources.

Figure 2A:
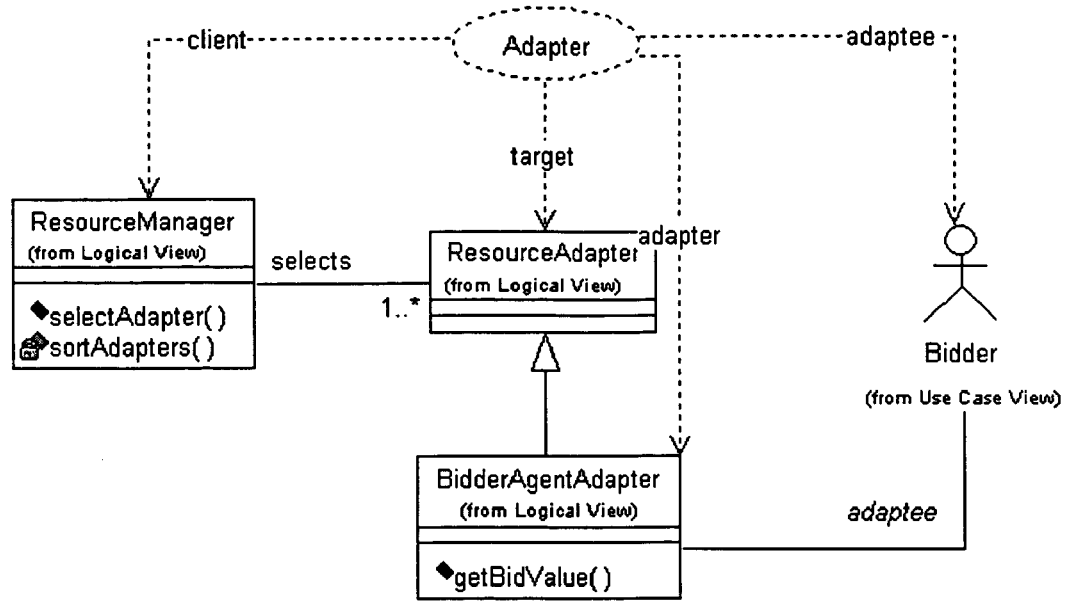
FIG. 2A is a class diagram with design patterns wherein a BidderAgentAdapter plays the role of adapter in the Adapter Pattern.
Figure 2B:
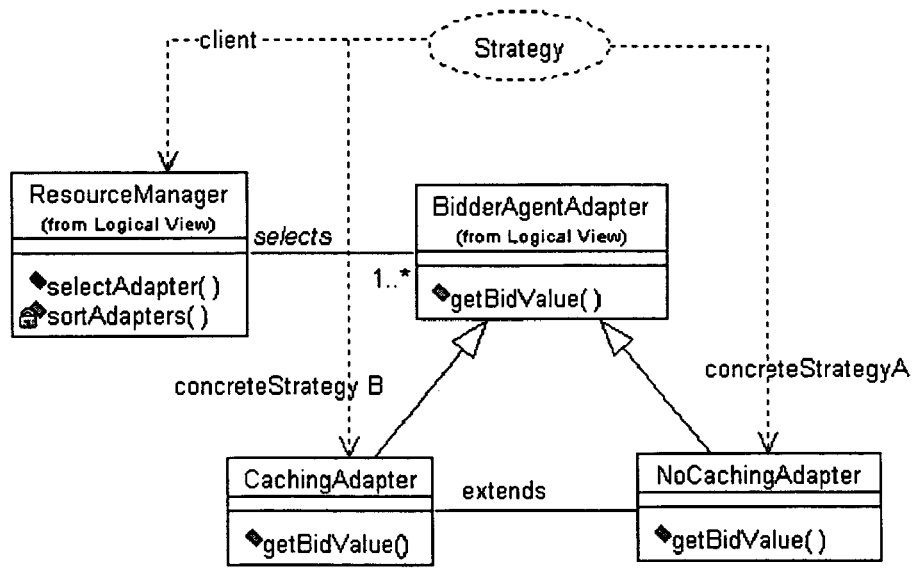
FIG. 2B is a class diagram with design patterns wherein the BidderAgentAdapter invokes one of either a CachingAdapter or a NoCachingAdapter according to the Strategy Pattern.

Turning to FIGS. 2A and 2B, the general class design of FIG. 2 is applied to the particular case of the BidderAgentAdapter which is an interface for communicating with the Bidder and use its services (FIG. 2A) and which implements the getBidValue( ) method via one of either the CachingAdapter or the NoCachingAdapter (FIG. 2B).

In these Figures, a notation has been added to the classical UML representation in order to represent Design Patterns (cd GoF book: Design Patterns: Elements of Reusable Object-Oriented Software, Gamma et al, Addison Wesley). Object-Oriented Design Patterns represent reusable pieces of object-oriented design that have been successfully used in different contexts in the past. The name in the dashed ellipse represents the name of the pattern, and the dashed lines represent the roles played by the different classes in that pattern. Thus, in FIG. 2A, the BidderAgentAdapter plays the role of the adapter.

According to the Strategy Pattern set forth in FIG. 2B, the CachingAdapter and NoCachingAdapter are used to implement the concrete getBidValue( ) method depending on whether caching is or is not to be used. The choice of whether the CachingAdapter or NoCachingAdapter is to be used may be made either by the BidManager or the Bidder. If the Bidder makes the decision on which Adapter is to be used, the Bidder can send the chosen Adapter to the BidManager for use (using for example the serialization and class loading mechanism present in the Java language. Similar mechanisms exist in other programming languages). The ResourceManager uses the getBidValue( ) method, irrespective of how the method is implemented in the subclasses.

Figure 3:
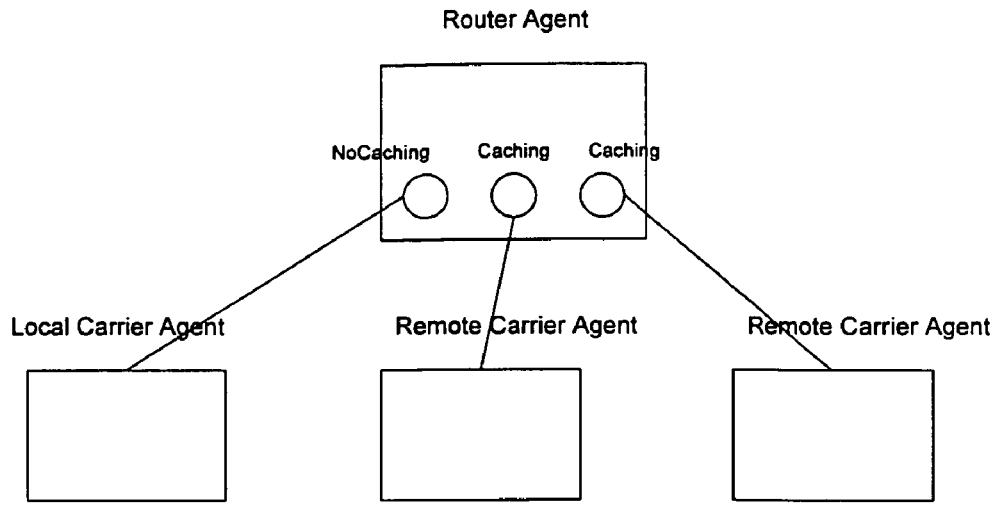
FIG. 3 is a block diagram showing selection between the CachingAdapter and the NoCaching Adapter.

FIG. 3 is a diagram showing how, in the Distributed AARS example, a choice is made between use of the CachingAdapter or the NoCachingAdapter depending on the location of the Carrier Agents.

Figure 4:
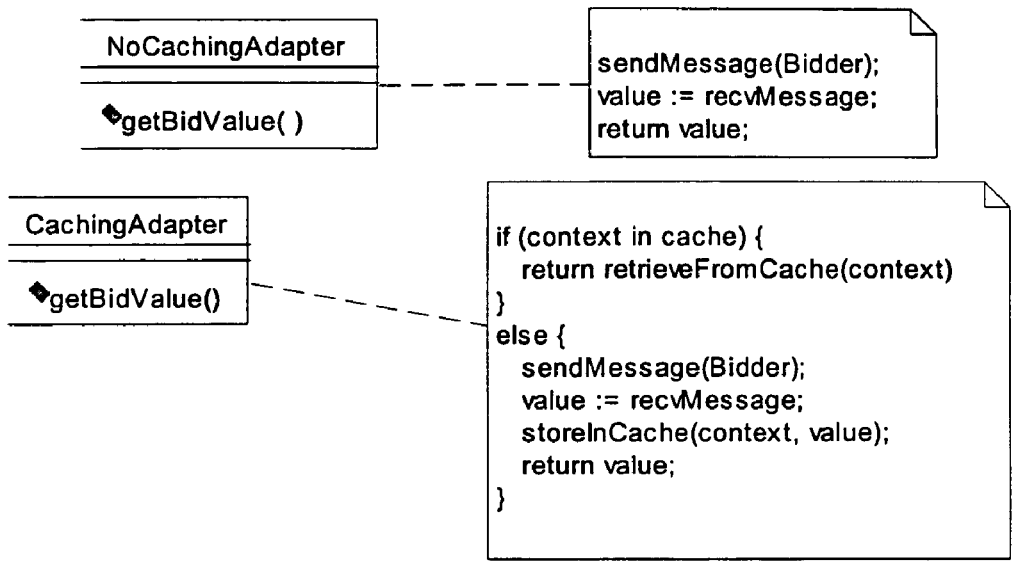
FIG. 4 shows pseudo-code for implementing a getBidValue( ) method of the CachingAdapter and the NoCachingAdapter.

A shown in FIG. 4, the Adapter that is not using caching (in this example, the NoCachingAdapter), sends a message to the Bidder to ask for its bid value. The Adapter then returns this value to the ResourceManager. The CachingAdapter first looks at its cache to see if it has already stored a bid value for the corresponding context in which case it returns that bid value. Otherwise, the CachingAdapter behaves like the NoCachingAdapter. Eventually, the CachingAdapter stores the new value in its cache for further reuse.

Figure 5:
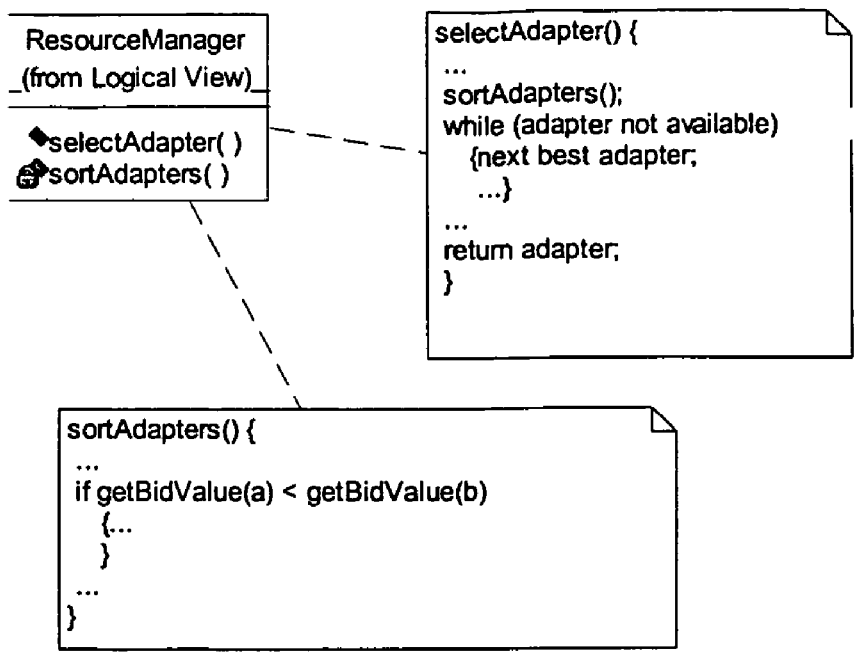
FIG. 5 shows pseudo-code for implementing selectadapter( ) and sortAdapters( ) methods of the ResourceManager.
Figure 6:
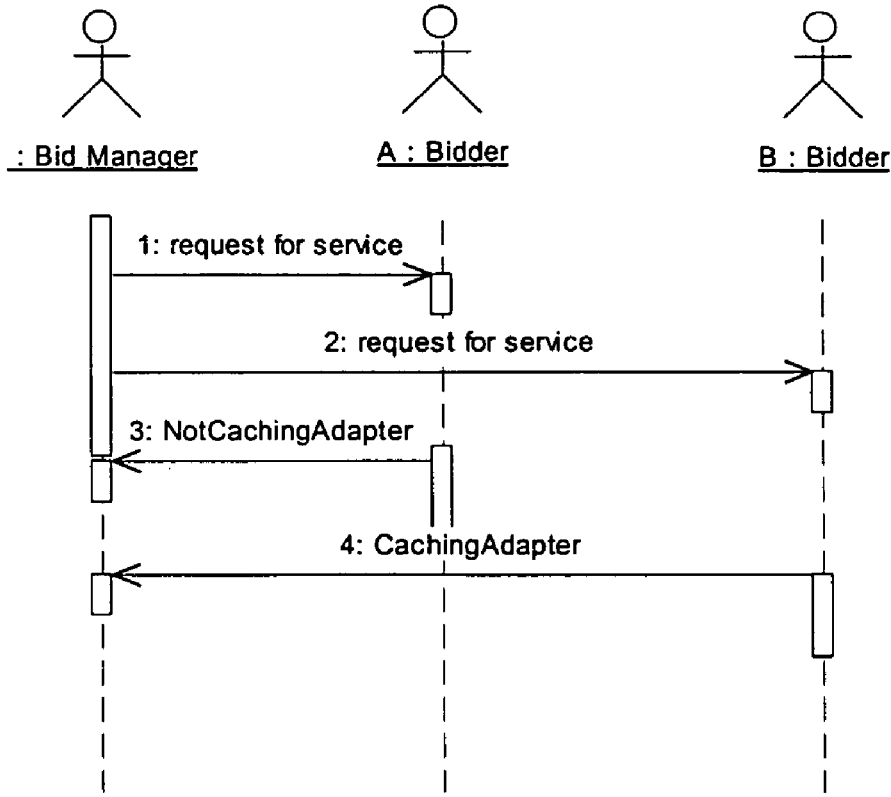
FIG. 6 is an interaction diagram showing how Bidders decide on which kind of ResourceAdapter the BidManager is to use for the bidding protocol.

FIG. 5 shows how the ResourceManager, which is the Client of the Strategy Pattern, selects an adapter by first sorting the Adapters by decreasing value of the bids, and then selecting the first available Bidder. By doing so, two goals are achieved. First, there is no need to reserve the Bidders during the sorting phase. If a bid is not interesting to the BidManager, the Bidder is still free to answer other calls for bids sent by other BidManagers. The reservation of the Bidder does not occur until the Bid Manager is actually selecting the first available Bidder from the sorted list. Second, the sorted list of Bidders can be cached for a given context, thereby completely avoiding the bidding process in some cases.

Turning to FIGS. 6 to 10, interaction diagrams are provided which describe all possible application scenarios wherein one Bidder uses the caching mechanism of the present invention (Bidder B) and one Bidder does not use the caching mechanism (Bidder A).

The first diagram (FIG. 6) shows the Bidders deciding which kind of ResourceAdapter they want the Bid Manager to use for the bidding protocol (i.e. whether or not to use caching). The request for service message asks agents if they want to take part in the subsequent bidding process. The Bidders agree to a request for service message by sending their selected Adapters.

Figure 7:
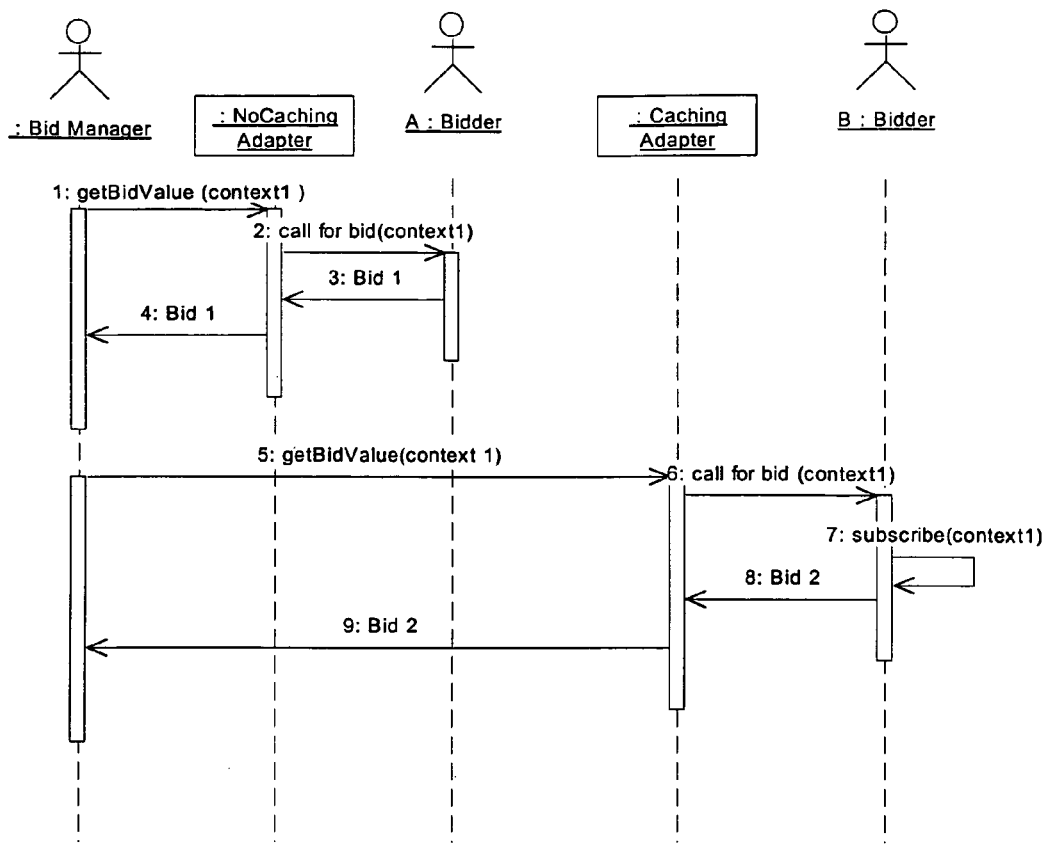
FIG. 7 is an interaction diagram showing the case where the Bid Manager does not have any previous bid from a certain Bidder.

FIG. 7 shows the case where, for a given context, the Bid Manager does not have any previous bid from Bidder B in its cache. The cache is maintained and consulted by the Bid Manager. The Bid Manager executes the getBidValue (context 1) method via the NoCachingAdapter sent by Bidder A and the CachingAdapter sent by Bidder B. Thus, the NoCachingAdapter calls for a bid from Bidder A for the given context (context 1), in response to which Bidder A returns a bid (Bid 1) to the Bid Manager. Meanwhile, the Caching Adapter also calls for a bid from Bidder B which, in response, subscribes to the Update Bid use case for the given context (context 1) and returns a bid to the Bid manager (Bid 2). Accordingly, the Bid Manager now has cached the Bid 2 value for context 1 from Bidder B so that the next time it implements the getBidValue (context 1) method, it will not send a call for bids to Bidder B, but will instead use its cached value.

Figure 8:
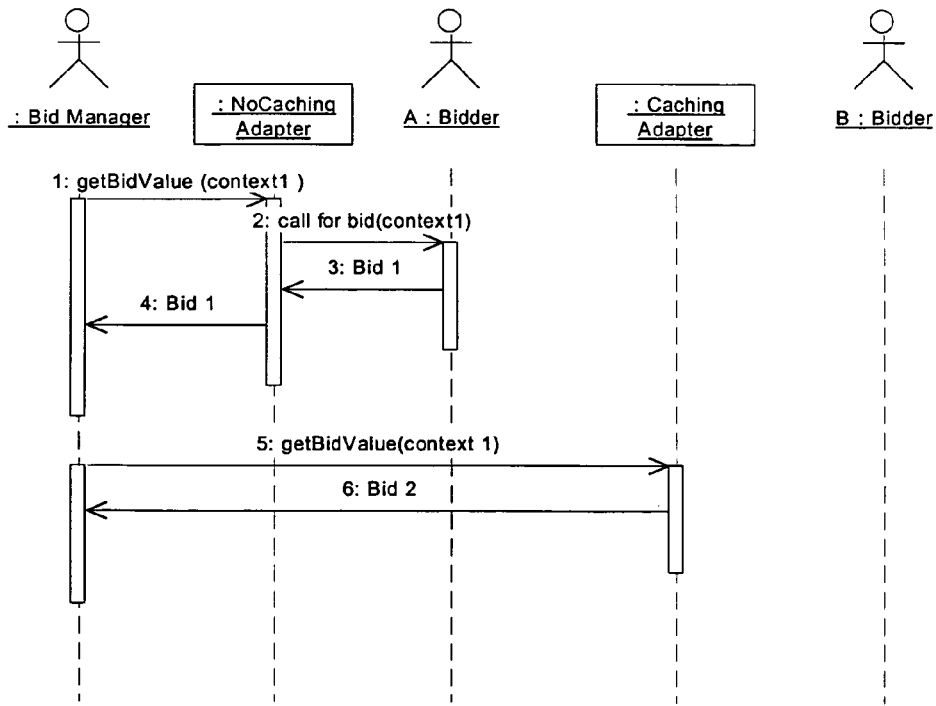
FIG. 8 is an interaction diagram showing the Bid Manager caching a Bid value for the certain Bidder for a given context.

This is shown in FIG. 8 where, in response to a second request for bids for context 1, the NoCachingAdapter sends a call for bids to Bidder A which, as before, returns a bid which is forwarded to the Bid Manager. However, the CachingAdapter returns the previously cached bid (Bid 2) to the Bid Manager instead of call for a bid from Bidder B. As indicated above, the Bid Manager maintains the cache using The CachingAdapter which is a component of the Bid Manager (having been sent by the Bidder to the Bid Manager).

Figure 9:
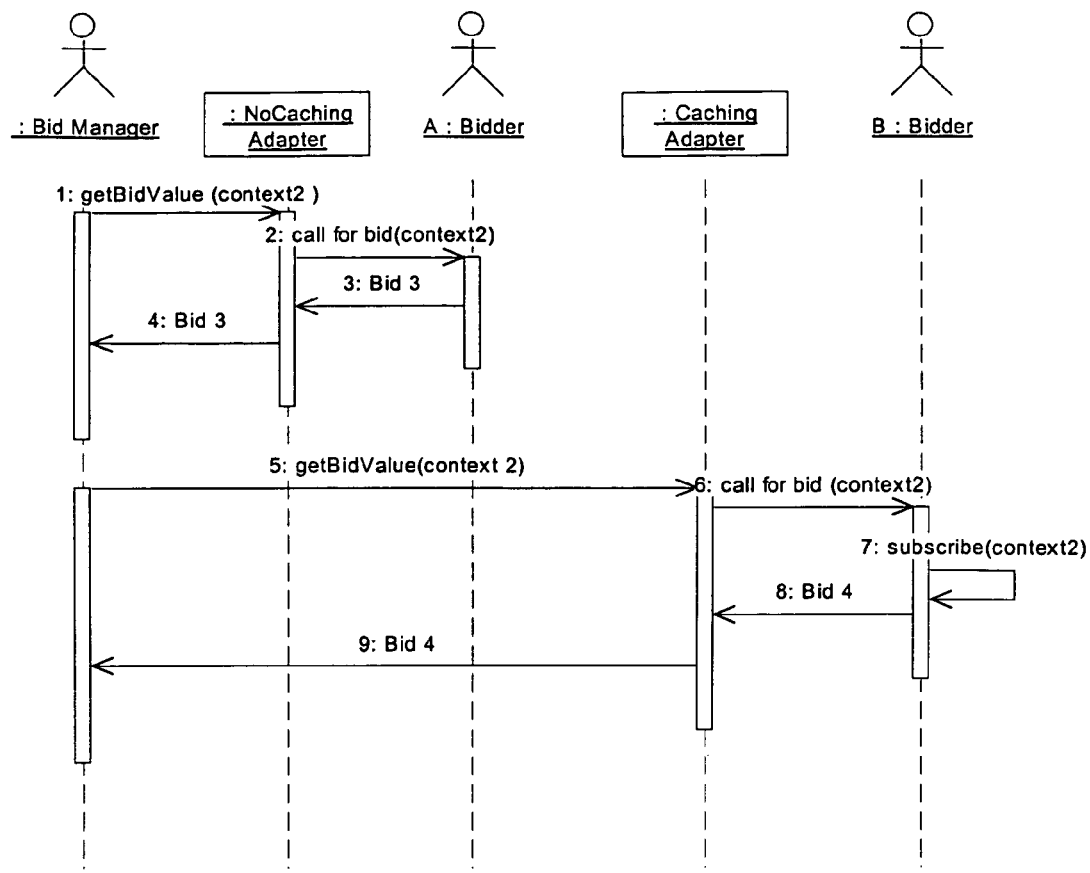
FIG. 9 is an interaction diagram showing the Bid Manager sending a call for bid to a Bidder for whom there is no cached Bid value.

In the event that the Bid Manager needs bids in a different context, it will be required to send a call for bid to Bidder B since there is no cached bid value for the new context. This is shown in FIG. 9. The Bid Manager executes the getBidValue (context 2) method via the NoCachingAdapter sent by Bidder A and the Caching Adapter sent by Bidder B. Thus, the NoCachingAdapter calls for a bid from Bidder A for the given context (context 2), in response to which Bidder A returns a bid (Bid 3) to the Bid Manager. Meanwhile, the Caching Adapter also calls for a bid from Bidder B which, in response, subscribes to the Update Bid use case for the given context (context 2) and returns a bid to the Bid manager (Bid 4). Accordingly, the Bid Manager now has cached the Bid 4 value for the new context (context 2) from Bidder B so that the next time it implements the getBidValue (context 2) method, it will not send a call for bid to Bidder B, but instead use its cached value.

Figure 10:
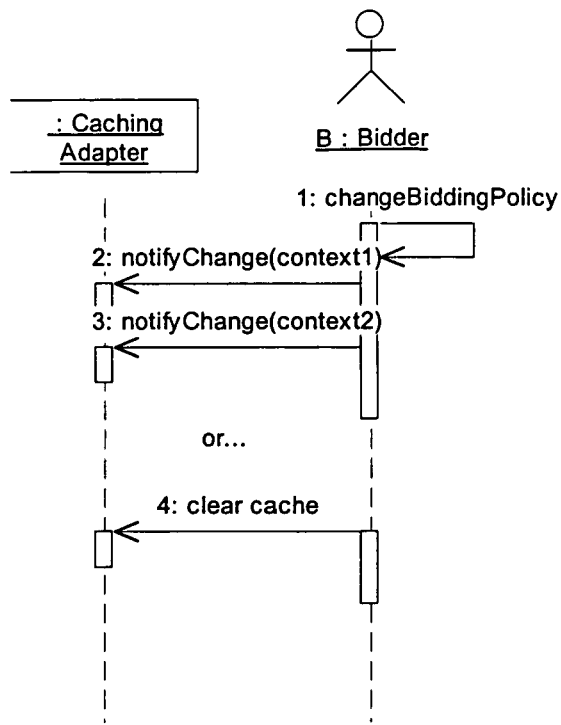
FIG. 10 is an interaction diagram showing notification of a change in bidding values of a Bidder to the Bid Manager.
Figure 11:
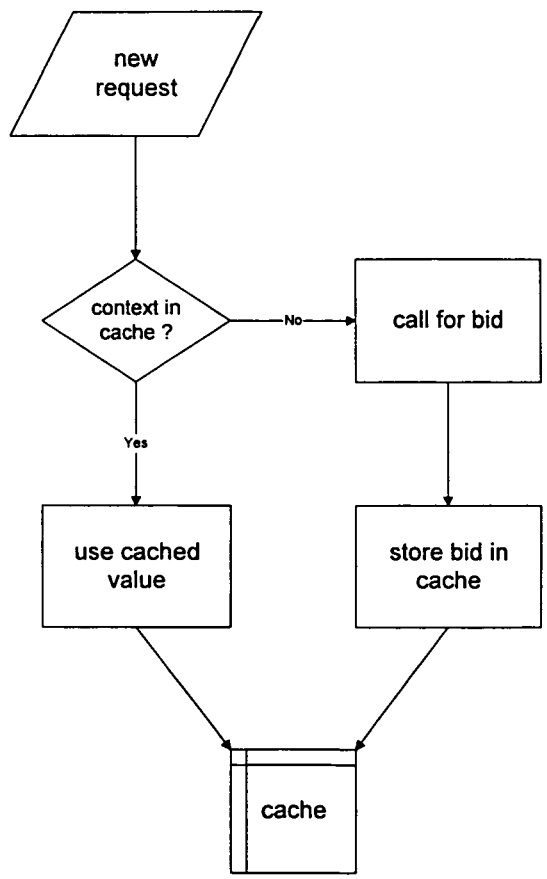
FIG. 11 is a flowchart showing the steps of a method for implementing the caching system of the present invention.
Figure 12:
FIG. 12 is a schematic illustration of an example of the caching system of the present invention applied to distributed advanced automatic route selection.

If Bidder B changes its bidding policies, it must notify the Bid Manager(s) of the change, in order to update the cache (FIG. 10). If the bidding policies are, for example, in the simple form of entries in a table, Bidder B can just send the new value(s) of the entry or entries that have changed, so that the Bid Manager simply updates the cache. In cases where bidding policies are represented as general rules, a notification of change is made in the policies so that the Bid Manager deletes all entries corresponding to B, in order to restart caching. The following pseudo-code exemplifies the foregoing:

Case 1: policy represented as an entry in the table:
Bidder:
If entry-changed then
Forall subscribers for the entry send new entry value
Case 2: if policy represented in any other way (such as rules):
Bidder:
Forall subscribers to the bidder send change notification
BidManager:
If received change notification then delete all entries in the bidder's cache FIG. 11 is a flowchart showing the caching process according to the present invention. The process of FIG. 11 will be better understood by considering the exemplary application of FIG. 12 which shows a distributed Advanced Automatic Route Selection (AARS), wherein Carrier Agent B is remote from the Router Agent (i.e. the Bid Manager) and Carrier Agent A, and is connected to the Router Agent via a leased line. Thus, there would be a considerable cost in terms of time-efficiency if Carrier Agent B was required to send a bid to the Router Agent for each call. On the other hand, since Carrier Agent A is running in the same machine as the Router Agent, the caching mechanism does not need to be used for it.

The following scenario will illustrate the use of the invention:

A call request is issued (new request in FIG. 11) from a Line Agent (see U.S. Pat. No. 5,675,636) with the following parameters representing the context of the call: (Destination: 613 TimeOfDay: AM). It will be appreciated that other parameters can be included such as DayOfWeek, TypeOfCall (voice or data), UsageForecast (to get volume discounts). However, for the sake of clarity this example considers only the use of two parameters. As discussed briefly above, in order to make the caching efficient, the values of the parameters should be discrete or discretized manually or by using a machine learning algorithm (e.g. TimeOfDay is represented in this example by two values: AM and PM). The content of the cache for Carrier B at this stage is: <empty>

The router sends a call for bid (FIG. 11) via the following message to Carriers A and B:
(type: CallForBid context: (Destination: 613 TimeOfDay: AM))
Carrier A replies with:
(type: Bid value: 12)
Carrier B replies with
(type: Bid value: 25)
The content of the cache becomes:

| Context | Bid Value |
| --- | --- |
| Dest: 613 ToD: AM | 25 |

The next call request (new request in FIG. 11) has the following values for its parameters: (Destination: 613 TimeOfDay: PM)
Since these values do not correspond to any entry in the cache (i.e. "No" following "context in cache?" in FIG. 11), the router sends a call for bids to both Carriers A and B (call for bid in FIG. 11).
Carrier A replies with:
(type: Bid value: 12)

Carrier B replies with
(type: Bid value: 19)
The contents of the cache is then updated (step 4) to become:

| Context | Bid Value |
|---|---|
| Dest: 613 ToD: AM | 25 |
| Dest: 613 ToD: PM | 19 |

The next call request (new request) has the following values for its parameters: (Destination: 613 TimeOfDay: PM)

The router finds an entry corresponding to the context in the cache (i.e. "Yes" following "context in cache?" in FIG. 11), it therefore uses the cache value for Carrier B ("use cached value" in FIG. 11), and only sends a call for bid to Carrier A. The cache is therefore not modified.

In the event the Carrier B's bidding policy changes and the change affect only a few entries in the cache, Carrier B sends an update for the changes: (type: Update context: (Destination: 613 TimeOfDay: AM) value: 23).

The content of the cache then becomes:

| Context | Bid Value |
|---|---|
| Dest: 613 ToD: AM | 23 |
| Dest: 613 ToD: PM | 19 |

Otherwise, if the changes affect more than a predetermined user defined percentage of the entries (e.g. 20%), Carrier B can alternatively send a change notification to the Router Agent so that the Router simply deletes the cache altogether and starts caching again from scratch.

Alternatives and variations of the invention are possible. For example, although the example presented herein relates to bidding by costing agents to provide a long distance carrier server in an automatic route selection system, the principles of the invention have broad applications to many multi-agent systems where Bid Managers require the services of resources which are represented in the system by agents. For example, an airline reservation agent may tender bids from several airline ticketing agents whose bids may be cached for individual contexts (e.g. flight dates, fares classes, etc.). All such variations and applications are believed to be within the sphere and scope of the invention as defined by the claims appended hereto.

What is claimed is:

1. A storage medium storing a set of program instructions executable on a data processing device and usable to create agents and adapters for optimizing a bidding process for resources, the set of program instructions comprising:

instructions for creating a bid manager agent for issuing a call for bids for usage of said resources, receiving said bids and selecting a best bid from among said bids, wherein each of said bids defines a predetermined context;

instructions for creating a plurality of bidder agents for issuing said bids according to predetermined bidding policies in response to said call for bids, wherein one of said bidder agents issues said best bid and provides said resources upon selection of said best bid by said bid manager agent; and instructions for creating a plurality of resource adapters for providing a uniform interface to access application program interfaces of said resources, one of said resource adapters being a caching adapter for maintaining cached bids for predetermined contexts from predetermined ones of said bidder agents, and for receiving from said bid manager agent said call for bids and issuing said cached bids to said bid manager agent instead of requiring said predetermined bidder agents to issue said bids, and a no-caching adapter for receiving from said bid manager agent said call for bids, re-issuing said call for bids to ones of said bidder agents other than said predetermined bidder agents, receiving said bids from said ones of said bidder agents other than said predetermined bidder agents and sending said bids to said bid manager agent.

2. The storage medium of claim 1, wherein said program instructions further comprise instructions for updating said cached bids in response to new contexts of said bids.

3. The storage medium of claim 1, wherein said program instructions further comprise instructions for selecting said best bid by sorting said resource adapters according to decreasing values of said bids and selecting a first available one of said bidder agents according to said resource adapters as sorted.

4. The storage medium of claim 1, wherein each said context is defined by a discrete parameter value.

5. The storage medium of claim 1, wherein said program instructions further comprise instructions for sending a notification message to said bid manager agent in the event of any changes to its bidding policies, in response to which said bid manager agent updates said caching adapter.

6. The storage medium of claim 5, wherein said program instructions further comprise instructions for storing said bidding policies via said caching adapter as entries in a table and updating individual ones of said cached bids to reflect said changes in said bidding policies.

7. The storage medium of claim 5, wherein said program instructions further comprise instructions for are storing said bidding policies via said caching adapter as general rules and clearing all of said cached bids.

8. An optimized method of acquiring bids from a plurality of bidder agents for resources, comprising the steps of:

issuing a request from a bid manager agent for bids for usage of said resources, wherein each of said bids defines a predetermined context;

accessing a cache of stored bids and related contexts to determine whether said cache contains bids defining said predetermined context;

issuing a call for bids to said bidder agents in connection with which no bids defining said predetermined context are stored in said cache, in response to which said bidder agents return bids to said bid manager agent and said bids are stored in said cache along with said predetermined context; and retrieving from said cache said bids defining said predetermined context previously stored by said bidder agents.

9. The optimized method of claim 8, further comprising the step of updating said stored bids in response to new contexts of said bids.

10. The optimized method of claim 8, further comprising the step of selecting a best bid by sorting said bids according to decreasing values of said bids and selecting a first available one of said bidder agents according to said sorting.

11. The optimized method of claim 8, wherein each said context is defined by a discrete parameter value.

12. The optimized method of claim 8, further comprising the step of sending a notification message to said bid manager agent in the event of any changes to its bidding policies, in response to which said bid manager agent updates said cache.

13. The optimized method of claim 12, further comprising the step of storing said bidding policies as entries in a table.

14. The optimized method of claim 13, further comprising the step of updating individual ones of said cached bids for updating said cache to reflect said changes in said bidding policies.

15. The optimized method of claim 12, further comprising the step of storing said bidding policies as general rules.

16. The optimized method of claim 15, further comprising the step of clearing all of said cached bids for updating said cache to reflect said changes in said bidding policies.

17. An apparatus for optimizing a bidding process for resources, the apparatus comprising:

a bid manager agent comprising means for issuing a call to bidder agents for bids for usage of said resources, means for receiving said bids and means for selecting a best bid from among said bids, wherein each of said bids defines a predetermined context;

a plurality of resource adapters for providing a uniform interface to access application program interfaces of said resources, one of said resource adapters being a caching adapter comprising means for maintaining cached bids for predetermined contexts from predetermined ones of said bidder agents, receiving from said bid manager agent said call for bids and issuing said cached bids to said bid manager agent instead of requiring said predetermined bidder agents to issue said bids, and a no-caching adapter comprising means for receiving from said bid manager agent said call for bids, re-issuing said call for bids to ones of said bidder agents other than said predetermined bidder agents, receiving said bids from said ones of said bidder agents other than said predetermined bidder agents and sending said bids to said bid manager agent.

* * * * *